(12) United States Patent
Kim et al.

(10) Patent No.: US 11,485,496 B2
(45) Date of Patent: Nov. 1, 2022

(54) SHELL LAUNCHER FOR DRONE AND METHOD OF LAUNCHING SHELL FOR DRONE USING SAME

(71) Applicant: HANWHA CORPORATION, Seoul (KR)

(72) Inventors: Se Hun Kim, Cheongju-si (KR); Hye Sung Kim, Daejeon (KR); Woon Soon Lee, Daejeon (KR); Yee Jung Kim, Sejong-si (KR); Yong Teo Jeong, Daejeon (KR)

(73) Assignee: HANWHA CORPORATION, Seoul (KR)

( * ) Notice: Subject to any disclaimer, the term of this patent is extended or adjusted under 35 U.S.C. 154(b) by 131 days.

(21) Appl. No.: 17/101,208

(22) Filed: Nov. 23, 2020

(65) Prior Publication Data
US 2021/0253250 A1 Aug. 19, 2021

(30) Foreign Application Priority Data
Dec. 30, 2019 (KR) .......................... 10-2019-0177896

(51) Int. Cl.
*B64D 1/06* (2006.01)
*B64C 39/02* (2006.01)

(52) U.S. Cl.
CPC .............. *B64D 1/06* (2013.01); *B64C 39/024* (2013.01); *B64C 2201/121* (2013.01)

(58) Field of Classification Search
CPC .................................. B64D 1/04; B64D 1/06
See application file for complete search history.

(56) References Cited

U.S. PATENT DOCUMENTS

| | | | | |
|---|---|---|---|---|
| 1,310,053 A * | 7/1919 | Brower | ............ | B64D 1/04 89/33.17 |
| 2,250,240 A * | 7/1941 | Steuerlein | ............ | B64D 1/04 89/1.59 |
| 2,608,131 A * | 8/1952 | Pearce | ............ | B64D 1/04 89/1.51 |
| 2,937,573 A * | 5/1960 | Gantschnigg | ............ | B64D 1/04 89/1.51 |
| 2,975,676 A * | 3/1961 | George | ............ | B64D 1/04 89/1.51 |
| 5,020,412 A * | 6/1991 | Adams | ............ | F41F 3/04 89/1.805 |
| 2019/0375506 A1* | 12/2019 | Chavez | ............ | F41F 3/065 |

FOREIGN PATENT DOCUMENTS

| | | | |
|---|---|---|---|
| CN | 107252531 A | * | 10/2017 |
| KR | 10-1741578 B1 | | 5/2017 |
| KR | 20180066376 A | * | 6/2018 |
| KR | 10-1912740 B1 | | 10/2018 |
| KR | 10-1935262 B1 | | 1/2019 |

* cited by examiner

*Primary Examiner* — Christopher D Hutchens
(74) *Attorney, Agent, or Firm* — WHDA, LLP

(57) ABSTRACT

Proposed are a shell launcher for a drone and a method of launching shells for a drone. According to the shell launcher for a drone and the method of launching shells for a drone, by launching shells such as EFPs using a drone, it is possible to use a drone as various weapon systems.

16 Claims, 8 Drawing Sheets

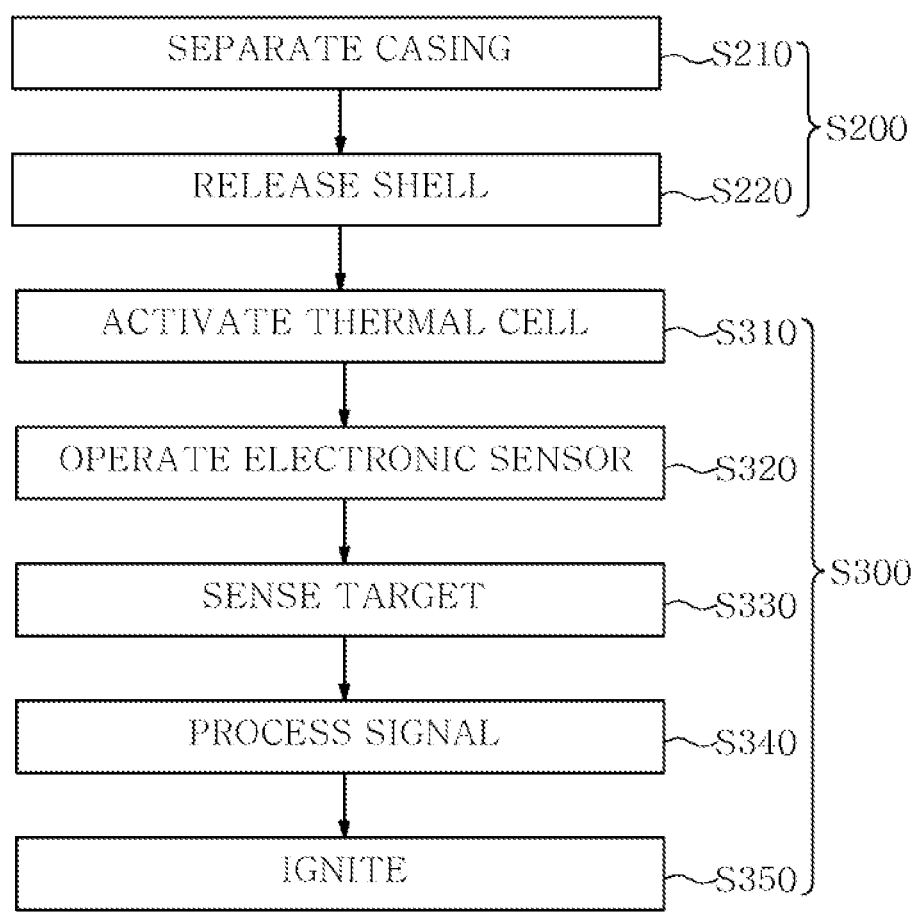

SHELL LAUNCHER FOR DRONE AND METHOD OF LAUNCHING SHELL FOR DRONE USING SAME

CROSS REFERENCE TO RELATED APPLICATION

This application claims the benefit of Korean Patent Application No. 10-2019-0177896, filed Dec. 30, 2019, which is hereby incorporated by reference in its entirety info this application.

BACKGROUND OF THE INVENTION

1. Technical Field

The present disclosure relates to a shell launcher for a drone and a method of launching shell for a drone and more particularly, to a shell launcher for a drone that improves usability of a drone in a wartime situation by launching shells using a drone, and a method of launching a shell for a drone.

2. Description of the Related Art

Drones, which are unmanned aerial vehicles that are remotely controlled through a wireless communication method, were developed first for military purposes and used for simple shooting practice, but the usable field thereof has expanded to various fields such as photography or transportation in addition to the military purposes due to lire development of electronic communication technology.

In general, a drone may include a plurality of fans outputting the lift, and batter supplying power to the fans, and a controller. The fans each may be composed of a motor generating torque using the power supplied from the battery and a propeller connected to the driving shaft of the motor.

Usability of drones will increase in the future wartime as small aerial vehicles and various methods of directly putting drones into a battlefield have been proposed.

At present, many drones are used for reconnaissance in battlefields but have difficulty in performing other operations.

Meanwhile, an EFP, which is a shell that is used by BLU 108, M93 Hornet of the U.S. or in the wide area denial munition system of Korea, is a kind of weapon systems that neutralizes enemy tanks.

An EEP is embedded in the ground like a mine and is released when sensing an enemy tank. A sensor in the EEP locates an enemy tank and the EEP is ignited, whereby the formed penetrator neutralizes an enemy tank by penetrating the upper portion of the enemy tank.

In particular, M93 Hornet and the EEP of a wide area denial munition are disposable but the sensor that senses enemy tanks is expensive, thus it is problematic that it is economically burdensome to operate the weapon.

DOCUMENT OF RELATED ART

Patent Document (Patent Document 1) Korean Patent No. 10-1935262 "Operating method of drone intelligence munitions and flight vehicle for close-in weapon system against missile, drone intelligence munitions or drone for close-in weapon system against missile" (registered on Dec. 28, 2018)

SUMMARY OF THE INVENTION

An objective of the present disclosure is to provide a shell launcher for a drone. The shell launcher is mounted on a drone and launches a shell using the drone so that the drone can be used for various weapon systems, and a method of launching a shell for a drone.

In order to achieve the objectives of the present disclosure, a shell launcher for a drone includes: a shell delivery casing having a shell storage space in which a plurality of shells is disposed, and having a bunching gate door being able to release shell on a bottom thereof; a launching rotor disposed on a top of the shell delivery casing and rotating the shell delivery casing; and a drone coupler disposed on the launching rotor and coupling the launching rotor to a drone.

An embodiment of the shell launcher for a drone according to the present disclosure may further include a gimbal unit disposed between the drone coupler and the launching rotor to maintain vertical and horizontal positions of the shell delivery casing.

An embodiment of the shell launcher for a drone according to the present disclosure may further include precessional guide rails disposed at an angle in the shell delivery casing and guiding the shells that are released downward to cause the shells to precess.

The shell delivery casing may include: a casing body having an open top and having the shell storage space therein; and a separating cover thread-fastened to the open top of the casing body and being rotated by the launching rotor, in which the launching rotor separates the separating cover from the casing body by rotating the separating cover in an opposite direction to a thread-fastening direction.

An embodiment of the shell launcher for a drone according to the present disclosure may further include; precessional guide rails disposed at an angle in the shell delivery casing and having guide rail grooves that are longitudinally formed to accommodate protrusions formed on outer sides of the shells and open downward; and releasing rail openers disposed at lower portions of the precessional guide tails to hold and support the protrusions of the shells in the guide rail grooves and to release the held protrusions, in which the precessional guide rails may be rotatably connected to the casing body through bearing at upper ends and may be disposed in pair to face each other at both sides of the shells.

An embodiment of the shell launcher for a drone according to the present disclosure may further include a shell retainer disposed in the shell delivery casing to hold and support bottoms of the stacked shells and to sequentially release the stacked shell through an open bottom of the shell delivery easing.

An embodiment of the shell launcher for a drone according to the present disclosure may further include shell support panels disposed in the shell delivery casing, having the shells thereon, and held by the shell retainer.

An embodiment of the shell launcher for a drone according to the present disclosure may further include processional guide rails disposed at an angle in the shell delivery casing and guiding the shells that are released downward to cause the shells to process, in which a shell support protrusion movably coupled to the processional guide mils and supporting a bottom of the inclined shell may be disposed on a top of each of the shell support panels.

The shell retainer may include: a shell pusher pushing down the shells stacked in the shell delivery casing; and rotary holders that are rotatably disposed in a side of the shell delivery casing and each having a plurality of shell holder blades, which holds and supports a bottom of a shell, on an outer side thereof, in which when the shell pusher is operated, the rotary holders may be pushed and rotated, thereby sequentially holding and supporting the shells that are released downward.

An embodiment of the shell launcher for a drone according to the present disclosure may further include holder stoppers that stop the rotary holders and enable the rotary holders to rotate only when being pushed and rotated by a predetermined level or more force.

The holder stopper may be a ball plunger having a structure in which a ball inserted in a side of the shell holder blade is elastically supported.

An embodiment of the shell launcher for a drone according to the present disclosure may further include a door lock that locks and unlock the shell gate door to keep the shell gate door closed or to open the shell gate door, in which the door lock may unlock the shell gate door to open the shell gate door after the launching rotor operated.

The shell delivery casing may include: a casing body having an open top and having the shell storage space therein; and a separating cover thread-fastened to the open top of the casing body and being rotated by the launching rotor, in which the launching rotor may separate the separating cover from the casing body by rotating the separating cover in an opposite direction to a thread-fastening direction, and the door lock may unlock the shell delivery casing to open the launching door after the launching rotor rotates the separating member in the thread-fastening direction.

The launching door may be rotatably hinged at an end to the shell delivery casing, may have the door lock at another end, and may rotate downward about a hinge to open the bottom of the shell delivery casing when the door lock is unlocked.

All embodiment of the shell launcher for a drone according to the present disclosure may further include a door lock that locks and unlocks the shell gate door to keep the shell gate door closed or to open the shell gate door, in which the door lock may receive power generated by operation of the shell pusher through a mechanical structure, thereby unlocking the shell gate door.

The door lock may include: a sliding member of which a portion is inserted in the shell delivery casing and the other portion is inserted in the launching gate door: a locking slide that is elastically supported by a spring and protrudes out of the sliding member to lock the sliding member; an unlocking spring that elastically supports the locking slide; and an unlocking slide that is moved down by rotation of the rotary holder and presses the locking slide to unlock the sliding member, in which when the sliding member is unlocked, the sliding member may be moved into the launching gate door by elastic restoring force of the unlocking spring, whereby the launching gate door may be unlocked.

The unlocking slide unit may include: an unlocking pinion gear part disposed in the rotary holder and being rotated by rotation of the rotary holder; and an unlocking rack gear member disposed in the side of the shell delivery casing to be movable up and down and vertically disposed in mesh with the pinion gear part.

In order to achieve the objectives of the present disclosure, a method of launching shells for a drone that moves a shell delivery casing keeping a plurality of shells therein using a drone and then releases the shells to hit a target, includes an individual releasing step of individually releasing the shells stacked in the shell delivery casing or a simultaneous releasing step of simultaneously releasing the shells by separating the shell delivery casing into two pails.

The simultaneous releasing step may include: a casing separation step that separates the shell delivery casing into two parts by rotating the shell delivery casing in any one of a clockwise direction and a counterclockwise direction: and a shell releasing step that simultaneously releases the shells after the shell separating step.

The individual releasing step may include: a casing rotating process that rotates the shell delivery casing in any one of the clockwise direction and the counterclockwise direction; a shell pushing process that pushes down the shells with a shell pusher: a bottom opening process that opens a launching gate door disposed at a bottom of the shell delivery casing; and an individual releasing process that releases a lowermost shell and then supports the shell on a right upper floor.

The individual releasing process may release the shells downward from the shell delivery casing while moving the shells along included precessional guide rails such that the released shells are caused to precess.

According to the present disclosure, since it is possible to use a drone for various weapon systems by launching shells using the drone, there is an effect that usability of the drone can be remarkably improved.

In particular, by launching EFPs, there is an effect that it is possible to economically operate EFPs and considerably improve usability of EFPs in a wartime situation.

BRIEF DESCRIPTION OF THE DRAWINGS

The above and other objectives, features and advantages of the present disclosure will be more clearly understood from the following detailed description taken in conjunction with the accompanying drawings, in which:

FIGS. 7A and 7B are flowcharts showing an embodiment of a method of launching shells for a drone according to the present disclosure.

DESCRIPTION OF THE PREFERRED EMBODIMENTS

The present disclosure is described hereafter.

Exemplary embodiments of the present disclosure are described hereafter in detail with reference to the accompanying drawings. Before describing the present disclosure, it should be noted that the terms or terminologies used herein and claims should not be construed as common meanings or the meanings in dictionaries. Therefore, the configurations described in the embodiments and drawings of the present disclosure are merely most preferable embodiments but do not represent all of the technical spirit of the present invention. Thus, it should be understood that the present disclosure should be construed as including all the changes, equivalents, and substitutions included in the spirit and scope of the present disclosure at the time of filing this application.

FIG. 1 is a cross-sectional view showing an embodiment of a shell launcher for a drone according to the present disclosure and FIG. 2 is a plan view showing the embodiment of a shell launcher for a drone according to the present disclosure.

Figure 1:
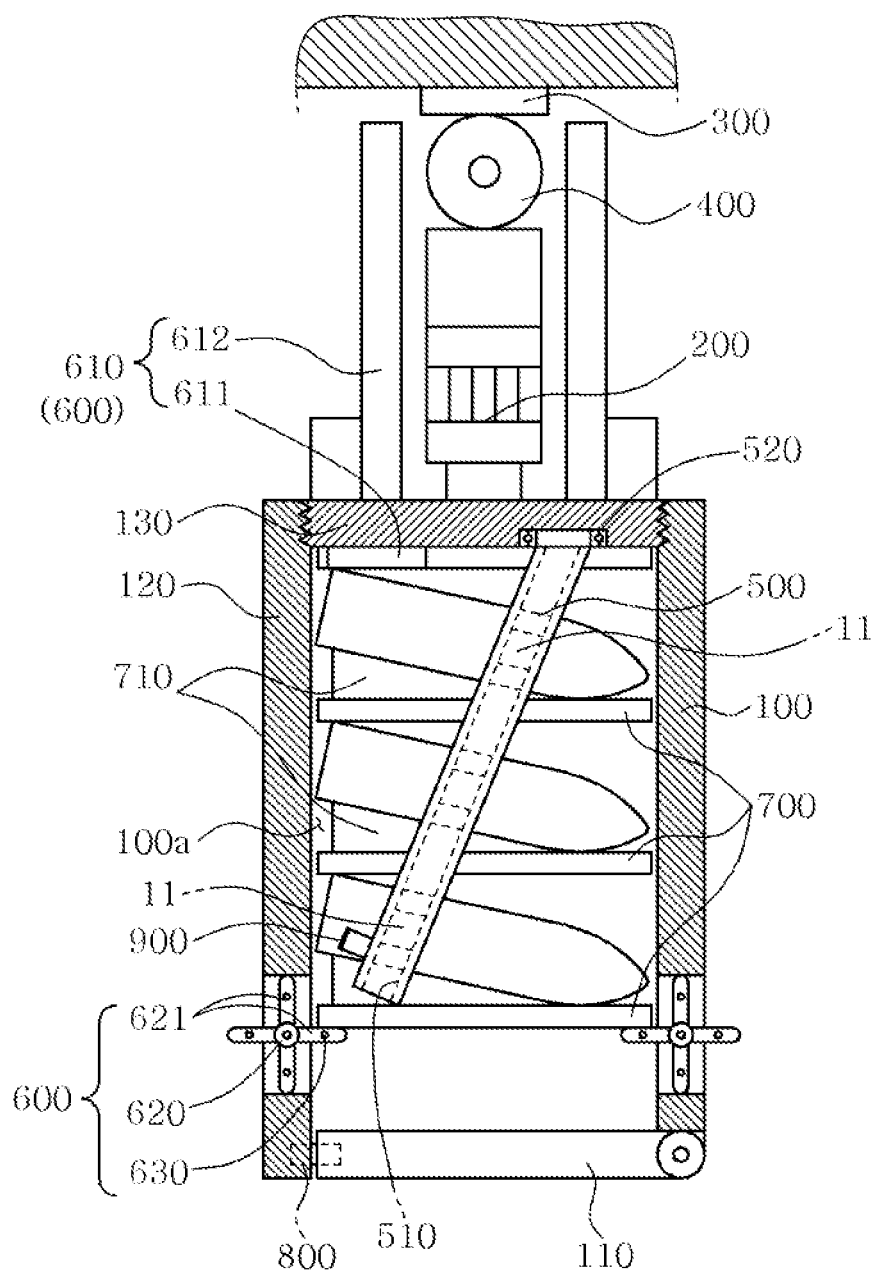
FIG. 1 is a cross-sectional view showing an embodiment of a shell launcher for a drone according to the present disclosure.
Figure 2:
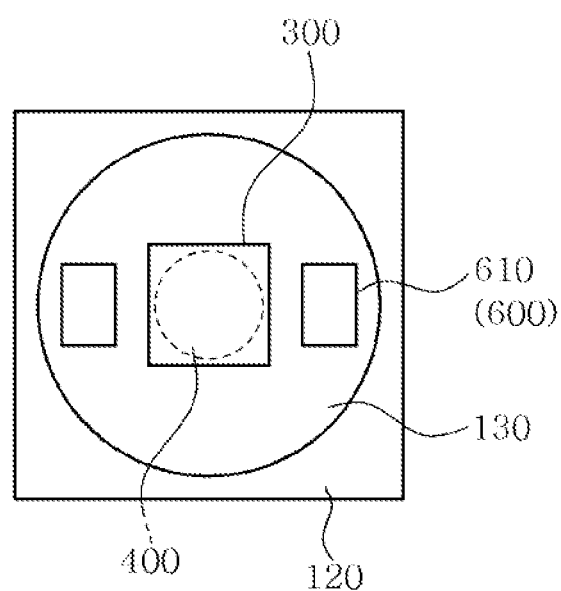
FIG. 2 is a plan view showing the embodiment of a shell launcher for a drone according to the present disclosure.

An embodiment of a shell launcher for a drone according to the present disclosure is described hereafter in detail with reference to FIGS. 1 and 2.

An embodiment of a shell launcher for a drone according to the present disclosure includes a shell delivery casing 100 having a shell storage space 100a therein in which a plurality of shells is disposed.

It is exemplified that shells are stacked in the shell storage space 100a of the shell delivery casing 100.

The shell delivery casing 100 has a top, a bottom, and a side surrounding the shell storage space 100a. A shell gate door 110 through which the shells stacked in the shell storage space 100a can be released is disposed at the bottom.

A drone coupler 300 for connection to a drone is disposed on the top of the shell delivery casing 100.

The drone coupler 300 is disposed on a launching rotor 200 disposed on the top of the shell delivery casing 100 and rotating the shell delivery casing 100 and couples the launching rotor 200 and the shell delivery casing 100 to a drone. Accordingly, the shell delivery casing 100 can be moved to a location where the shells will be released by the drone.

The drone coupler 300 can be modified in various ways using well-known coupling structures for separable connection to a drone such as induction coupling that uses an electromagnet, so it is no more described in detail.

It is exemplified that the shells in the shell delivery casing 100 are antitank FFPs, and it should be noted that other well-known shells that can hit a target can be used.

The embodiment of a shell launcher for a drone according to the present disclosure may further include a gimbal 400 disposed between the drone coupler and the launching rotor 200 to maintain the horizontal and vertical positions of the shell delivery casing 100.

The gimbal unit 400 can be modified in various ways using the well-known gimbal structure that rotates about a front-rear axis and a left-right axis to maintain the horizontal and vertical positions of a floating device or equipment, so it is no more described in detail.

The gimbal unit 400 may horizontally and vertically position the shell delivery casing 100 while a drone flies, so the shell delivery easing 100 is horizontally and vertically positioned and is stably rotated by the launching rotor 200 so that the shells therein can be stably released.

The embodiment of a shell launcher for a drone according to the present disclosure further includes a processional guide rail 500 that is disposed at an angle in the shell delivery casing 100 and causes precession of the shells by guiding the shells that are released downward.

The processional guide rails 500 have a guide rail groove 510 that is formed in the longitudinal direction and in which protrusions 11 formed on the outer sides of the shells are inserted, is mounted on the inner side of the shell delivery casing 100, and is inclined to cause precession of the shells that are release downward.

The precession guide rails 500 are disposed in a pair facing each other at both sides of the shells, thereby stably supporting the shells and causing smooth precession when the shells are released.

The guide rail grooves 510 are open at the lower ends of the processional guide rails 500, so shells are released downward without the protusions 11 blocked.

In general, au EFP has an IR sensor and a protrusion is formed at the position of the IR sensor.

Accordingly, it is exemplified that EFPs are stacked in the shell delivery casing 100 with the protrusion 11 having the IR sensors inserted in the guide rail grooves 510, but it should be noted that other protrusions 11 may be formed on the outer sides of the shells to be inserted in the guide rail grooves 510.

According to the shell launcher for a drone of the present disclosure, after the shell launcher is moved to a location where the shells will be released, that is, a target location, the shell delivery casing 100 is rotated by the launching rotor 200, the shell gate door 110 at the lower portion opens, and the stacked shells are sequentially released downward.

In this process, torque is applied to the shells by the launching rotor 200 and the shells are released along the precessional guide rails 500. Accordingly, the shells hit a target or a target location while processing.

The shells are movably coupled to the launched precessional guide rails 500 and are positioned at an angle in the shell delivery casing 100. When the shells are released, they receive torque from the launching rotor 200 while moving down along the precessional guide rails 500, so they precess after being released.

The shell delivery casing 100 includes a casing body 120 open upward and having the shell storage space 100a therein, and a separating cover 130 thread-fastened to the open top of the casing body 120 and rotated by the launching rotor 200.

The precessional guide rails 500 are rotatably connected to the casing body 120 at the upper ends through bearings 520, so they keep inclined regardless of the separating cover 130 without rotating with the separating cover 130 even when the separating cover 130 rotates.

The launching rotor 200 can separate the separating cover 130 from the casing body 120 by rotating the separating cover 130 in the opposite direction to the thread-fastening direction.

When the thread-fastening direction of the separating cover 130 is the counterclockwise direction, the launching rotor 200 can separate the separating cover 130 by rotating it clockwise.

Since the weight of the shells in the casing body 120 is applied to the casing body 120, when torque is generated by the launching rotor 200, the casing body 120 can keep fixed. Accordingly, it is possible to separate the separating cover 130 from the casing body 120 by rotating the separating cover 130 in the opposite direction to the thread-fastening direction through the launching rotor 200.

According to the embodiment of a shell launcher for a drone of the present disclosure, the launching rotor 200 rotates the separating cover 130 in the opposite direction to the thread-fastening direction of the separating cover 130, that is, in the loosening direction of the separating cover 130, whereby the casing body 120 is separated and dropped. Accordingly, the top of the casing body 120 is opened and the shells that have been stored in the casing body 120 can be simultaneously released over the open top of the casing body 120.

It should be noted that when the shell gate door 110 is opened and the stacked shells are sequentially released down from the shell delivery casing 100, the launching rotor 200 generates torque in the same direction as the thread-fastening direction of the separating cover 130, thereby preventing the separating cover 130 separating from the casing body 120.

The embodiment of a shell launcher for a drone according to the present disclosure may further includes releasing rail openers 900 disposed at the lower portions of the precessional guide rails 500, holding and supporting the protrusions 11 of the shells in the guide rail grooves 510, and releasing the protrusions 11.

The releasing rail openers 900 hold and support the protrusion 11 of a shell by at least partially closing the guide rail grooves 510 by reciprocating a shell holder protruding in the guide rail grooves 510. Further, the releasing rail openers 900 release the held protrusion 11 by fully opening the guide rail grooves 510 so that the shell can be released down from the guide rail grooves 510.

The releasing rail opener 900 may be a hydraulic cylinder in which the shell holder is a piston rod and may be modified in various ways using well-known straight moving structure such as a ball screw type-linear actuator structure and a rack and pinion structure including a pinion gear rotated by a motor and a rack gear engaged with the pinion gear, so it should be noted that it is no more described in derail.

The release holders 900 are positioned to open the lower portions of the guide rail grooves 510 in the normal state, and primarily holds and supports the protrusion of a shell by at least partially closing the guide rail grooves 510 when the launching rotor 200 separates the separating cover 130 by rotating it.

When the casing body 120 is separated from the separating cover 130 by rotation of the separating cover 130, the protrusion 11 of the lowermost shell is held by the releasing rail opener 900, so the shell is maintained at the position.

After the casing body 120 is separated from the separating cover 130, the held protrusion 11 is released by hilly opening the guide rail grooves 510 such that the stacked shells can be sequentially released downward from the guide rail grooves 510.

A shell retainer 600 that holds the bottoms of the stacked shells and enables the stacked shells to be sequentially released through the open lower portion is disposed in the shell delivery casing 100.

The embodiment of a shell launcher for a drone according to the present disclosure may further include shell support panels 700 disposed in the shell delivery case 100, having shells thereon, and held by the shell retainer 600.

The shell support panels 700 are disposed under the shell to support the shells, and when the stacked shells held by the shell retainer 600 are sequentially released to the lower open portion, the shell support panels 700 keep the shells, which stand to be released, stably positioned in the shell delivery casing 100.

The shell support panel 700 is disposed between the stacked shells and is disposed under the lowermost shell so that the shells are stably stacked in the shell delivery casing 100.

A shell support protrusion 710 that supports the bottom of a shell, which is inclined and movably coupled to the precessional guide rails 500 is disposed on the top of the shell support panel 700 so that the shell can be stably maintained at an angle.

The shell support profusion 710 has a slope supporting the bottom of the inclined shell, so the shell can be more stably supported.

The shell retainer 600 includes a shell pusher 610 that pushes down the shells stacked in the shell delivery casing 100 and a rotary holder 620 that is rotatably disposed in the side of the shell delivery casing 100 and has a plurality of shell holder blades 621, which holds and supports the bottom of a shell, on the outer side. When the shell pusher 610 is operated, the rotary holder 620 is pushed and rotated, thereby sequentially holding and supporting the shells that are released downward.

An open space is formed through portions of the side of the shell delivery casing 100 so that the rotary holders 620 can rotate. The rotary holder 620 is disposed in the open space in the side such that the protruding shell holder blades 621 can smoothly rotate without getting stuck.

When the rotary holder 620 is rotated, some of the shell holder blades 621 are exposed out of the shell delivery casing 100 through the open space of the side, whereby the rotary holder 620 can rotate without the shell holder blades 621 stuck and the bottom of the shell support panel 700 can be held and the shells can be maintained at the positions by the shell holder blades 621.

It is exemplified that the shell holder blades 621 protrude from the outer surfaces of the rotary holders 620 and are circumferentially spaced thereon and hold and support the bottom of the shell support panel 700.

A plurality of rotary holders 620 is provided to distribute the load of the stacked shells so that the stacked shells can be stably maintained at the positions.

The shell pusher 610 includes a shell pusher panel 611 disposed in the shell delivery casing 100 and pushing down shells, and an elevator 612 moving down the shell pusher panel.

It should be noted that the elevator 612 is, for example, an electronic telescopic device having a column that electrically stretches into several sections, may be modified in various ways using a straight reciprocating structure including a pinion gear rotated by a motor and a rack gear or a straight reciprocating actuator such as a ball screw type-linear actuator, and is no more described in detail.

The shell retainer 600 may further include bolder stoppers 630 that stop the rotary holders and enable the rotary holders 620 to rotate only when being pushed and rotated by a predetermined level or more force.

The embodiment of a shell launcher for a drone according to the present disclosure further includes a door lock 800 that locks and unlocks the shell gate door 110 to keep it closed or to open it.

The shell gate door 110 has an end rotatably hinged to the shell delivery casing 100 and another end where the door lock 800 is disposed, whereby when the door lock 800 is unlocked, the shell gate door 110 rotates downward about the lunge and opens the bottom of the shell delivery casing 100.

After the launching rotor 200 is operated, the door lock 800 unlocks the shell gate door 110 to open the shell gate door 110. Accordingly, after the launching rotor 200 is rotated, the stacked shells can be sequentially released downward from the shell delivery casing 100.

Figure 3:
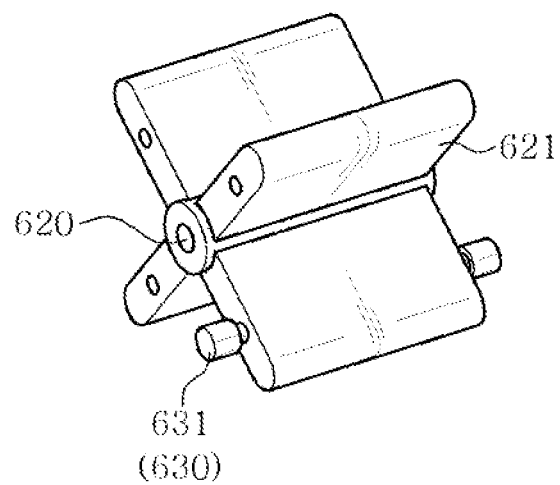
FIG. 3 is a view showing an embodiment of a shell retainer in the embodiment of a shell launcher for a drone according to the present disclosure.

FIG. 3 is a view showing an embodiment of a shell retainer in the embodiment of a shell launcher tor a drone according to the present disclosure. Referring to FIG. 3, the holder stopper 630 is, for example, a ball plunger 631 having a structure in which a ball inserted in a side of the shell holder blade 621 is elastically supported.

Ball seats in which the balls of the ball plungers 631 are inserted are formed on both sides of the shell holder blade 621 and the ball plungers 631 are disposed on both sides of the shell holder blade 621 to be able to stably fix the position of the shell holder blade 621.

The ball plungers fix the position of the shell holder blade 621 before the shell holder blade 621 is pushed and rotated by the shell pusher 610.

The shell holder blade 621 is fixed at the position by the ball plungers 631 and supports the bottom of a shell support panel 700.

When the shell holder blade 621 is pushed by the shell pusher 610 and the rotary holder 620 is rotated, the lowermost shell is released and then the next shell holder blade 621 is stopped by the ball plungers and holds and supports the shell of the next upper floor.

Figure 4:
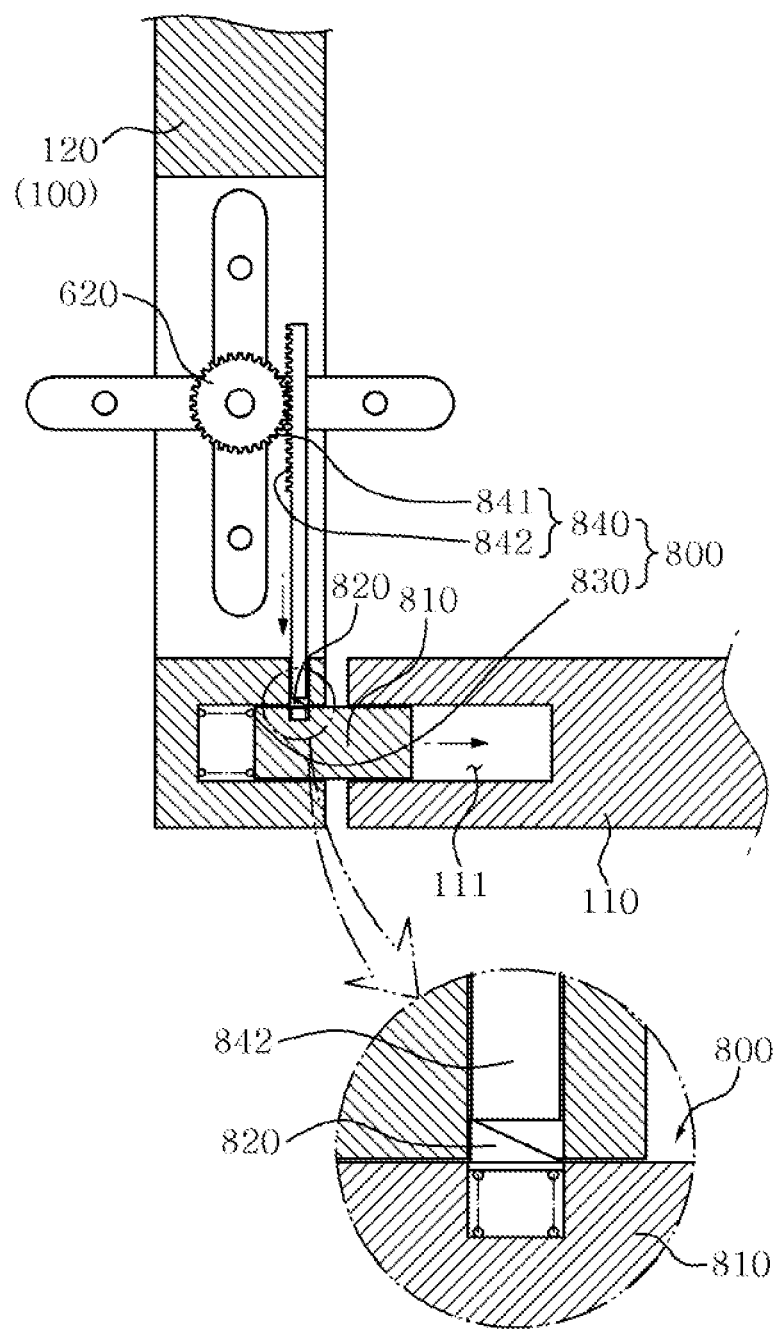
FIG. 4 is a view showing an embodiment of a gate door lock that locks a shell gate door in the embodiment of a shell launcher for a drone according to the present disclosure.

FIG. 4 is a view showing an embodiment of the door lock 800 that locks the shell gate door 110 in the embodiment of a shell launcher for a drone according to the present disclosure. The door lock 800 receives power generated by operation of the shell pusher 610 through a mechanical structure, thereby unlocking the shell gate door 110.

In detail a portion of the door lock 800 includes: a sliding member 810 of which a portion is inserted in the shell delivery casing 100 and the other portion is inserted in the launching gate door 110 to slide only into the launching gate door 110; a locking slide 820 that is elastically supported by a spring and protrudes out of the sliding member 810 to lock the sliding member 810; an unlocking spring 830 that elastically supports the locking slide 820; and an unlocking slide unit 840 that is moved down by rotation of the rotary holder 620 and presses the locking slide 820 to unlock the sliding member 810.

A portion of the sliding member 810 is inserted in the side of the shell delivery casing 100 and the other portion is inserted in the launching gate door 110 to keep the launching gate door 110 closed.

The locking slide 820 is elastically supported by a spring and protrudes out of the sliding member 810 and to be locked to the side of the shell delivery casing 100. thereby fixing the sliding member 810 compressing the unlocking spring 830.

When the sliding member 810 compresses the unlocking spring 830 and is fixed by the locking slide 820, a portion of the sliding member 810 is inserted in the side of the shell delivers casing 100 and the oilier portion is inserted in the launching gate door 110, thereby keeping the launching gate door 110 closed.

The locking slide 840 includes an unlocking pinion gear part 841 disposed in the rotary holder 620 and being rotated by rotation of the rotary holder 620, and an unlocking rack gear member 842 disposed in the side of the shell delivery casing 100 to be movable up and down and vertically disposed in mesh with the pinion gear part.

The unlocking rack gear member 842 is moved down by rotation of the unlocking pinion gear part 841 and presses the locking slide 820, thereby unlocking the sliding member 810. The sliding member 810 is pushed frilly into an unlocking space 111 in the launching gate door 110 by elastic restoring force of the unlocking spring 830, thereby unlocking the launching gate door 110.

That is, when the shell pusher 610 is operated shells are pushed down, and the rotary holder 620 is rotated, the unlocking pinion gear pan 841 is also rotated and the rack gear member is moved down and presses the locking slide 820, whereby the sliding member 810 is unlocked.

In the unlocked state, the entire sliding member 810 is pushed into the unlocking space 111 of the launching gate door 110 by the unlocking spring 830, whereby the launching gate door 110 is unlocked.

When the sliding member 810 is fully inserted in the unlocking space 111, the launching gate door is unlocked and rotated downward about a hinge, thereby opening the bottom of the shell delivery casing 110 such that shells can be released.

Figure 5:
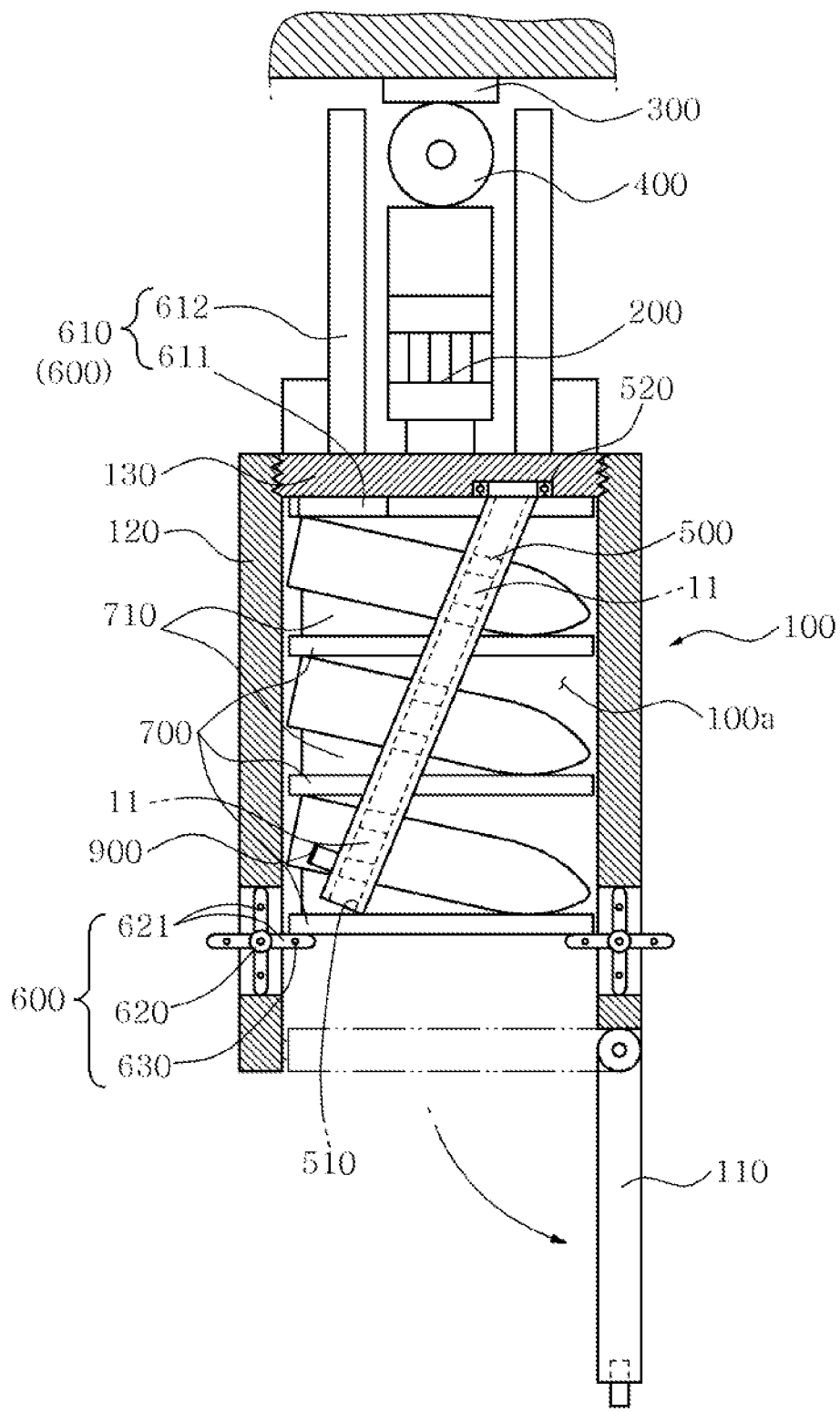
FIGS. 5 and 6 are views showing an example of launching shells in the embodiment of a shell launcher for a drone according to the present disclosure.
Figure 6:
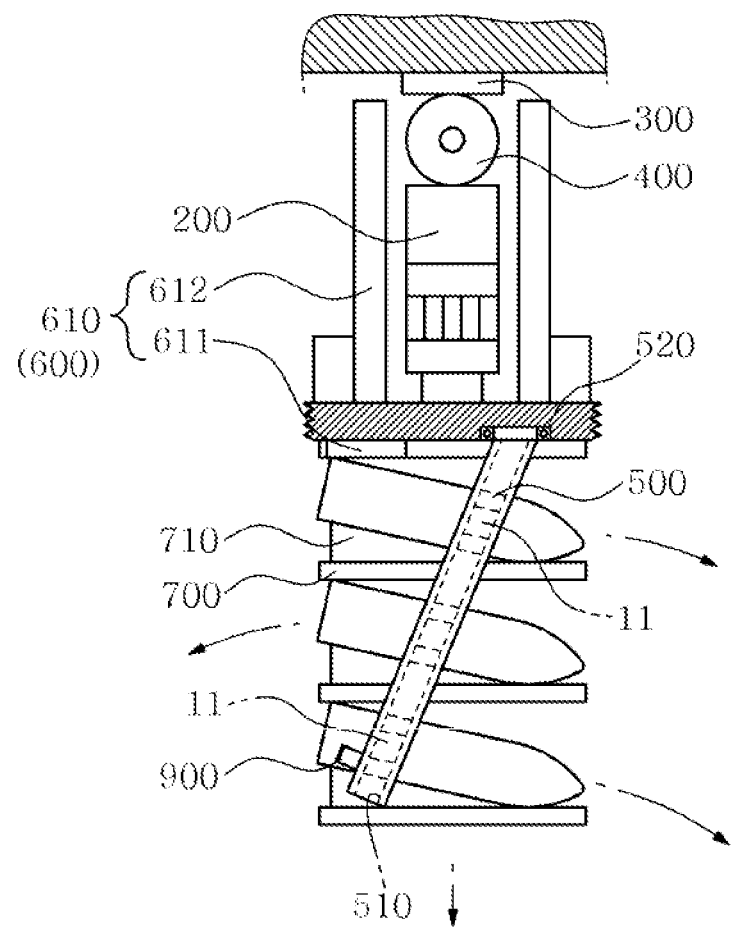
Figure 6:
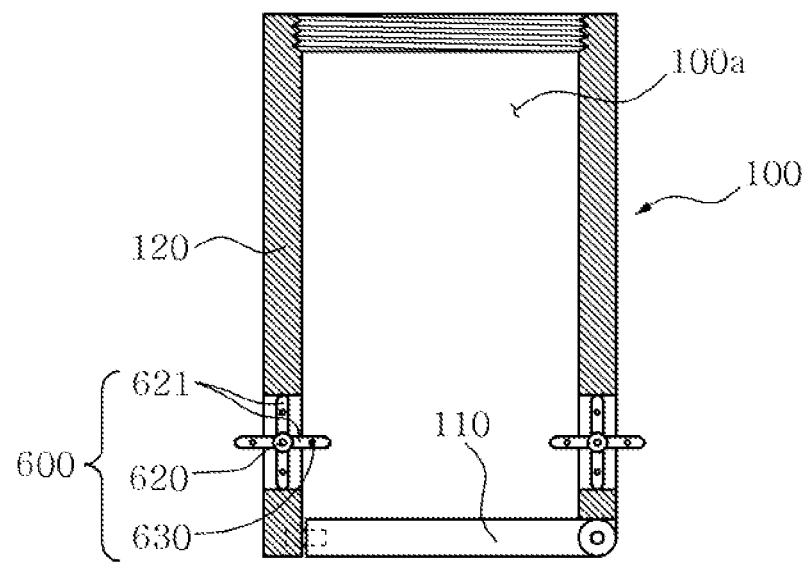

FIGS. 5 and 6 are views showing an example of launching shells in the embodiment of a shell launcher for a drone according to the present disclosure. Referring to FIGS. 5 and 6, according to the shell launcher for a drone of the present disclosure, it is possible to sequentially launch a plurality of stacked shells downward from the shell delivery casing 100 while rotating the shell delivery casing 100 by totaling the separating cover 130 in the thread-fastening direction using the launching rotor 200. Further, it is also possible to simultaneously launch a plurality of shells in the casing body 120 by separating the casing body 120 by rotating the separating cover 130 in the opposite direction to the thread-fastening direction using the launching rotor 200.

Referring to FIGS. 1, 3, 4, and 5, according to the shell launcher for a drone of the present disclosure, it is possible to push and discharge a shell on one floor by operating the shell pusher 610 while rotating the shell delivery casing 100 in the thread-fastening direction of the separating cover 130 that is, clockwise after moving the shell delivery casing 100 to a target launching location of the shell using a drone.

When the shell pusher panel 611 is moved down such that the shell pusher 610 can push the shell on only one floor to launch the shell, the lowermost shell is pushed and rotates the rotary holders 620. In this case, the launching gate door 110 is unlocked by rotation of the rotary holders 620 and rotated downward about the hinge. Accordingly, the launching gate door 110 opens and the lowermost shell is released.

After the rotary holders 620 rotate only a predetermined angle while the lowermost shell is pushed and released, the rotary holders 620 are stopped by the holder stoppers 630, thereby holding and supporting the shell support panel 700 supporting the shell stacked right over the released shell.

Torque is applied to the individually released shells by the launching rotor 200 and the shells are released along the precessional guide rails 500. Accordingly, the shells hit a target or a target location while processing.

After the shell is released, it is possible to move the drone to another target and then release again the lowermost shell by operating the shell pusher 610.

Accordingly, it is possible to individually hit a plurality of targets by individually releasing a plurality of shells.

In detail, retelling to FIGS. 1 and 6, according to the shell launcher for a drone of the present disclosure, the shell delivery casing 100 is moved to a target launching location of shells by the drone and then the casing body 120 is separated by rotating the separating cover 130 in the opposite direction to the clockwise direction that is the thread-fastening direction, that is, counterclockwise using the launching rotor 200, whereby it is possible to simultaneously release a plurality of shells in the casing body 120 over the open top of the casing body 120.

That is, while the launching rotor 200 separates the casing body 120 by rotating the separating cover 130 in the opposite direction to the clockwise direction that is the thread-fastening direction, that is, counterclockwise, the shells keep stacked with the protrusions held by the releasing rail opener 900. After the casing body 120 is completely separated and removed from the separating cover 130, the guide rails 500 are fully opened by the releasing rail opener 900, so the stacked shells can be simultaneously released downward from the guide rail grooves 510.

Figure 7A:
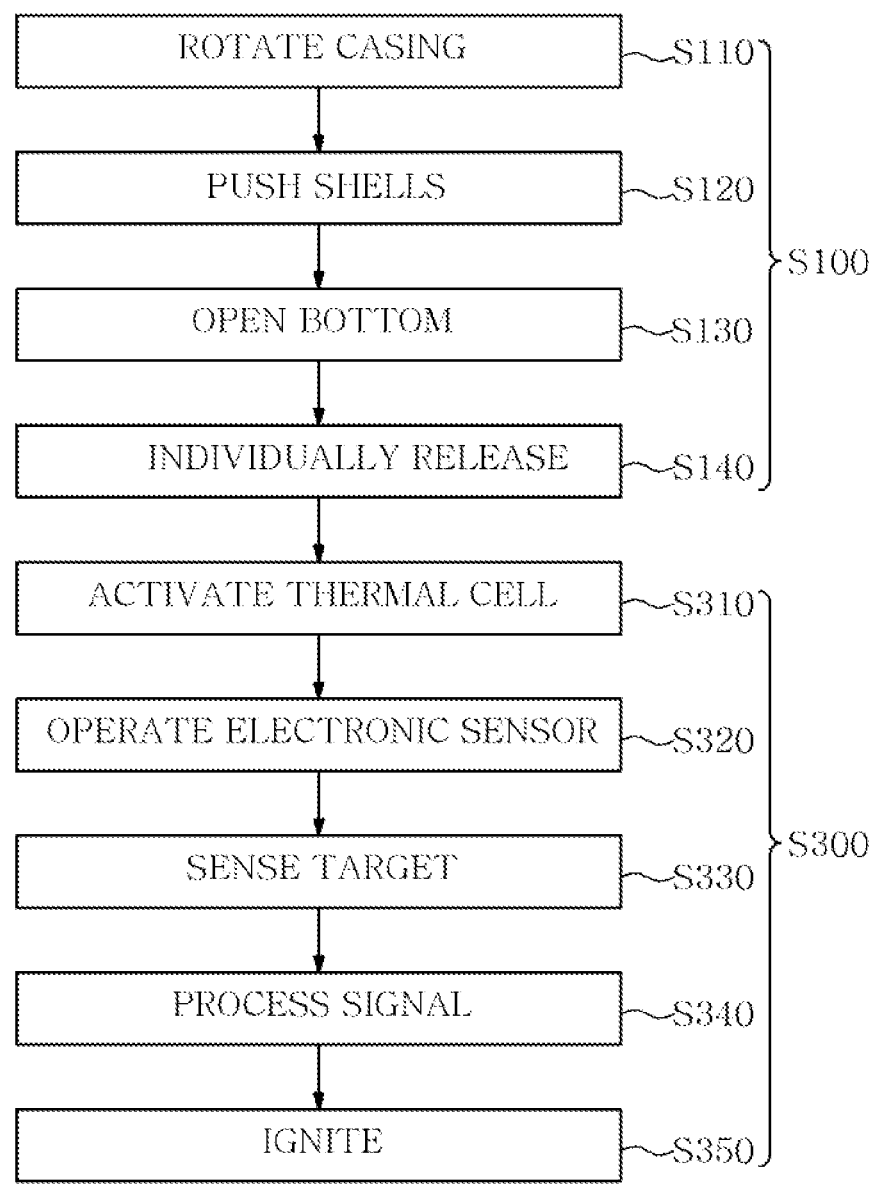

FIGS. 7A and 7B are flowcharts showing an embodiment of a method of launching shells for a drone according to the present disclosure. FIG. 7A is a flowchart showing an example of simultaneously releasing shells (S200) and FIG. 7B is a flowchart showing an example of individually releasing shells (S100).

Referring to FIGS. 1 to 7, an embodiment of a method of launching shell for drones, which is a shell launching method that moves the shell delivery casing 100 keeping a plurality of shells therein using a drone and then releases the shells to hit a target, includes an individual releasing step of individually releasing shells stacked in the shell delivery casing 100 (S100) or a simultaneous releasing step of simultaneously releasing a plurality of shells by separating the shell delivery casing 100 into two pans (S200).

It should be noted that the method of launching shells for a drone of the present disclosure a method of launching shells using the shell launcher for a drone of the present disclosure described with reference to FIGS. 1 to 6.

The individual releasing step (S100) individually releases shells in accordance with the slacked order by rotating the shell delivery casing 100 in any one of the clockwise direction and the counterclockwise direction.

The simultaneous releasing step (S200) may include a casing separation step (S210) that separates the shell delivery casing 100 into two parts by rotating the shell delivery casing 100 in any one of the clockwise direction and the counterclockwise direction, and a shell releasing step (S220) that simultaneously releases a plurality of shells alter the shell separating step (S210).

That is, the simultaneous releasing step (S200) simultaneously releases a plurality of shells in the shell delivery casing 100 by separating the separating member 130 and the casing body 120 by rotating the separating member 130 in the opposite direction to the thread-fastening direction using the launching rotor 200.

The individual releasing step (S100) includes a casing rotating process (S110) that rotates the shell delivery casing 100 in any one of the clockwise direction and the counterclockwise direction, a shell pushing process (S120) that pushes down the shells with the shell pusher 610, a bottom opening process (S130) that opens the launching gate door 110 disposed at the bottom of the shell delivery casing 100, and an individual releasing process (S140) that releases the lowermost shell and then supports the shell on the right upper floor.

The individual releasing process (S140) releases the shells downward from the shell delivery casing 100 while moving the shells along the inclined processional guide rails 500 such that the released shells are caused to precess.

The method of launching shells for a drone according to the present disclosure, which is a shell launching method of hitting a target, for example, a tank by releasing EFPs, further including a target hitting step of hitting a target with EFPs after the individual releasing step (S100) or the simultaneously releasing step (S200).

The target hitting step (S300) includes a process of activating a thermal cell of the EFPS (S310), a process of operating an electronic sensor (S320), a process of sensing a target (S330), a process of processing a signal (S340), and an ignition process (S350), which are well known as operation steps for hitting a target with EFP, so they are no more described in detail.

The method of launching shells for a drone according to the present invention can individually hit a plurality of targets by individually releasing shells stacked in the shell delivery casing 100 through the individual releasing step (S100) and can also simultaneously hit one target with a plurality of shells through the simultaneously releasing step (S200). Accordingly, it is possible to usability of shells and more efficiently operate shells in accordance with targets.

According to the present disclosure, since it is possible to use a drone as various weapon systems by launching shells using the drone, usability of the drone can be remarkably improved.

In particular, by launching EFPs, it is possible to economically operate EFPs and considerably improve usability of EFPs in a wartime situation.

The present disclosure is not limited to the embodiments described above and may be modified in various ways without departing from the scope of the present disclosure and the modifications should be construed as being included in the present disclosure.

What is claimed is:

1. A shell launcher for a drone, comprising:
   a shell delivery casing having a shell storage space in which a plurality of shells are disposed, and having a launching gate door for releasing shell on a bottom thereof;
   a launching rotor disposed on a top of the shell delivery casing and rotating the shell delivery casing; and
   a drone coupler disposed on the launching rotor and coupling the launching rotor to a drone,
   wherein the shell delivery casing comprises:
   a casing body having an open top and having the shell storage space; and
   a separating cover thread-fastened to the open top of the casing body and rotated by the launching rotor,
   wherein the launching rotor separates the separating cover from the casing body by rotating the separating cover in an opposite direction to a thread-fastening direction.

2. The shell launcher for a drone of claim 1, further comprising a gimbal unit disposed between the drone coupler and the launching rotor to maintain vertical and horizontal positions of the shell delivery casing.

3. The shell launcher for a drone of claim 1, further comprising precessional guide rails disposed at an angle in the shell delivery casing and guiding the shells that are released downward to cause the shells to precess.

4. The shell launcher of claim 1, further comprising:
   precessional guide rails disposed at an angle in the shell delivery casing and having guide rail grooves that are longitudinally formed to accommodate protrusions formed on outer sides of the shells and are opened downward; and
   releasing rail openers disposed at lower portions of the precessional guide rails to hold and support protrusions of the shells in the guide rail grooves and to unhold protrusions,
   wherein the precessional guide rails are rotatably connected to the casing body via bearing at upper ends and the precessional guide rails are disposed in pair to face each other at both sides of the shells.

5. The shell launcher of claim 1, further comprising a shell retainer disposed in the shell delivery casing to hold and support bottoms of stacked shells and to sequentially release the stacked shell through an open bottom of the shell delivery casing.

6. The shell launcher of claim 5, further comprising shell support panels disposed in the shell delivery casing, having the shells, and held by the shell retainer.

7. The shell launcher of claim 6, further comprising precessional guide rails disposed at an angle in the shell delivery casing and guiding the shells that are released downward to cause the shells to precess, wherein a shell support protrusion movably coupled to the processional guide rails and supporting a bottom of the inclined shell is disposed on a top of each of the shell support panels.

8. The shell launcher of claim 4, wherein the shell retainer comprises:
a shell pusher pushing down the shells stacked in the shell delivery casing; and
rotary holders that are rotatably disposed in a side of the shell delivery casing and each having a plurality of shell holder blades, which holds and supports a bottom of a shell on an outer side, and
when the shell pusher is operated, the rotary holders is pushed and rotated, and sequentially holding and supporting the shells that are released downward.

9. The shell launcher of claim 8, wherein the shell retainer further comprises holder stoppers that stop the rotary holders and enable the rotary holders to rotate only when being pushed and rotated by a predetermined level or more force of the predetermined level.

10. The shell launcher of claim 9, wherein the holder stopper is a ball plunger having a structure in which a ball inserted in a side of the shell holder blade is elastically supported.

11. The shell launcher of claim 8, further comprising a door lock that locks and unlocks the shell gate door to keep the shell gate door closed or to open the shell gate door,
wherein the door lock receives power generated by operation of the shell pusher, thereby unlocking the shell gate door.

12. The shell launcher of claim 11, wherein the door lock comprises:
a sliding member of which a portion is inserted in the shell delivery casing and the other portion is inserted in the launching gate door;
a locking slide that is elastically supported by a spring and protrudes out of the sliding member to lock the sliding member;
an unlocking spring that elastically supports the locking slide; and
an unlocking slide unit that is moved down by rotation of the rotary holder and presses the locking slide to unlock the sliding member,
wherein when the sliding member is unlocked, the sliding member is moved into the launching gate door by elastic restoring force of the unlocking spring, whereby the launching gate door is unlocked.

13. The shell launcher of claim 12, wherein the unlocking slide unit comprises:
an unlocking pinion gear part disposed in the rotary holder and being rotated by rotation of the rotary holder; and
an unlocking rack gear member disposed in the side of the shell delivery casing to be movable up and down and vertically disposed in mesh with the pinion gear part.

14. The shell launcher of claim 1, further comprising a door lock that locks and unlocks the shell gate door to keep the shell gate door closed or to open the shell gate door,
wherein the door lock unlocks the shell gate door to open the shell gate door after the launching rotor is operated.

15. The shell launcher of claim 14, wherein the door lock unlocks the shell delivery casing to open the launching door after the launching rotor rotates the separating member in the thread-fastening direction.

16. The shell launcher of claim 14, wherein the launching door is rotatably hinged at an end to the shell delivery casing, and has the door lock at another end, and rotates downward about a hinge to open the bottom of the shell delivery casing when the door lock is unlocked.

* * * * *